Nov. 5, 1963 J. C. HOOVER 3,109,988
ELECTROMAGNETIC RADIATION MONITOR UTILIZING MEANS
RESPONSIVE TO ALL TYPES OF POLARIZATION
Filed Aug. 4, 1961 2 Sheets-Sheet 2

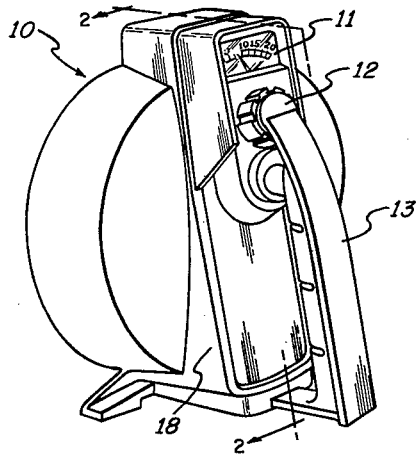
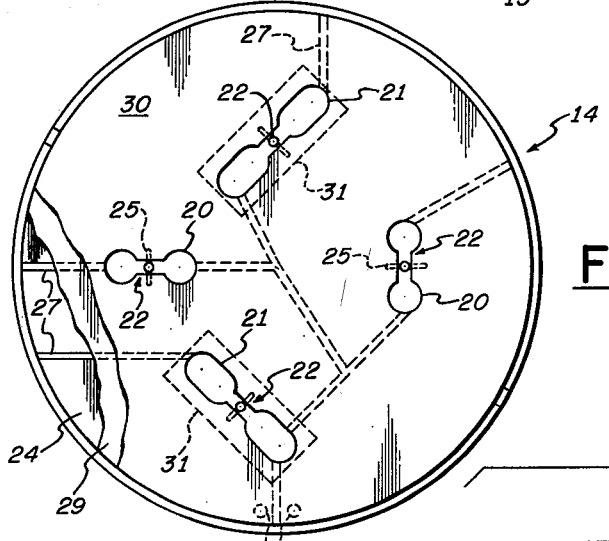
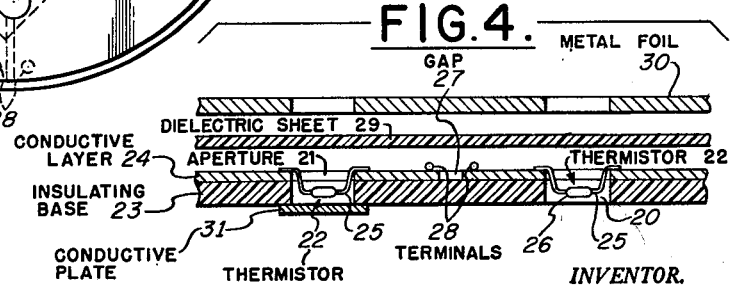

INVENTOR.
JOHN C. HOOVER
BY
ATTORNEY the approximate diameter of base material 23 and placed over dielectric sheet 29. Metal foil 30 contains

United States Patent Office 3,109,988
Patented Nov. 5, 1963

3,109,988
ELECTROMAGNETIC RADIATION MONITOR UTILIZING MEANS RESPONSIVE TO ALL TYPES OF POLARIZATION
John C. Hoover, Clearwater, Fla., assignor to Sperry Rand Corporation, Great Neck, N.Y., a corporation of Delaware
Filed Aug. 4, 1961, Ser. No. 129,438
9 Claims. (Cl. 325—364)

This invention relates to radiation responsive devices, and more particularly to electromagnetic radiation monitoring devices.

Conventional electromagnetic radiation monitors usually require several antennas to cover a desired frequency range since each antenna usually covers less than one octave in frequency. Consequently, it is necessary for the user of such devices to make a series of radiation measurements employing each antenna in turn in order to determine the total energy in a given frequency range.

Furthermore, conventional monitors are usually sensitive to linear polarization of only one orientation. Because of this characteristic, it is necessary for the user of such devices to rotate the antenna axially in order to align the plane of polarization of the antenna with that of the received energy. If circularly polarized radiation is encountered with such devices, the measurement can be in error by 3 db.

One of the principal objects of the present invention is to provide an improved radiation monitor that is equally responsive to received signals of all frequencies within the desired range of measurements.

Another object of the present invention is to provide an improved radiation monitor that is equally responsive to received signals regardless of the polarization of these signals.

A further object of the present invention is to provide an antenna for a radiation monitor that responds to the sum of all of the received energy regardless of polarization or frequency within the range to be measured.

According to the present invention, these and other objects are achieved by detecting the incident electromagnetic energy with at least one pair of mutually perpendicular non-resonant wave reception elements, and then combining the signals thus derived.

Figure 5:
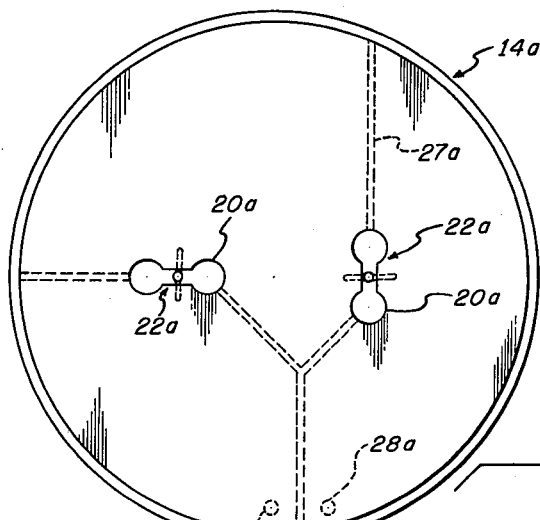
Figure 6:
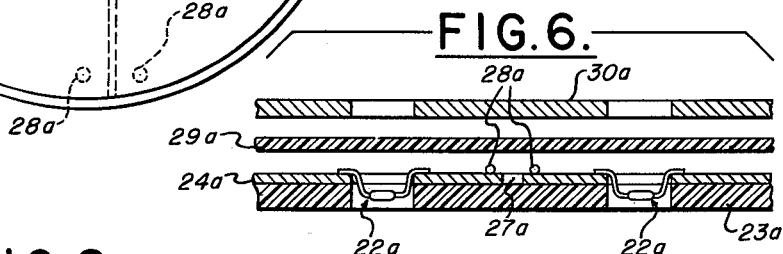
Figure 8:
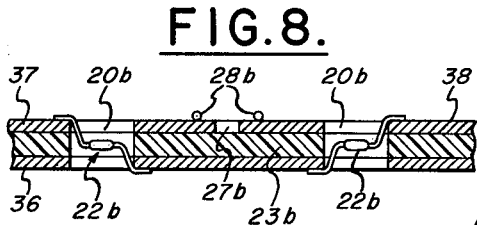
Figure 7:
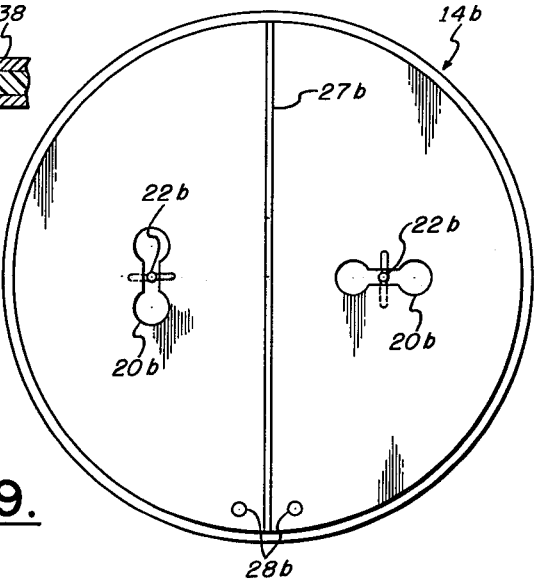
Figure 9:
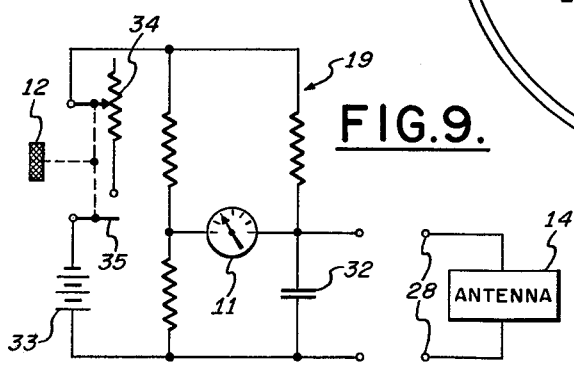

The invention will be described with reference to the accompanying drawings, wherein:

FIG. 1 is a perspective view of an instrument embodying principles of the invention, FIG. 2 is a section in the plane 2—2 of FIG. 1, FIG. 3 is an elevational view of a preferred embodiment of the invention, FIG. 4 is a diagram in the form of an exploded cross-section that is useful in describing the embodiment of the invention depicted in FIG. 3, FIG. 5 is an elevational view of another embodiment of the invention, FIG. 6 is a diagram in the form of an exploded cross-section that is useful in describing the embodiment of the invention depicted in FIG. 5, FIG. 7 is an elevational view of still another embodiment of the invention, FIG. 8 is a diagram, cross-sectional in form, that is useful in describing the embodiment of the invention depicted in FIG. 7, and FIG. 9 is a schematic diagram of a typical resistance measuring circuit that may be used with the invention.

Referring first to FIGS. 1 and 2, an instrument embodying the present invention includes a unitary housing 10, an indicating meter 11, and a circuit-adjusting knob 12 convenient to a carry-handle 13. Antenna assembly 14 is supported in housing 10 so as to intercept the radiant energy 15 which is to be measured. This assembly conveniently is made several wavelengths in diameter at the highest frequency to be measured. Microwave absorbing material 16 substantially fills cavity 17 behind antenna assembly 14. Microwave absorbing material 16 may be fabricated from suitable materials well known in the art such as the types employing a foam plastic partially filled with conducting particles. Hollow pedestal 18 is used to support and contain an electrical measuring circuit such as circuit 19 shown schematically in FIG. 9.

Referring now to FIGS. 3 and 4, antenna assembly 14 contains a pair of high frequency elongated apertures 20 oriented with their longitudinal axes substantially at right angles to each other and having an electrical length shorter than one-half the wavelength of the highest frequency to be measured. Low frequency elongated apertures 21 are also oriented with their axes substantially at right angles to each other. These apertures have a length greater than the high frequency apertures 20, but are shorter than one-half wavelength at the lowest frequency of operation.

The axes of apertures 20 are disposed conveniently at an angle of 45° with respect to the corresponding axes of apertures 21, however the operation of the invention is not dependent upon this particular relationship.

The various elongated apertures preferably are formed in a dumbbell shape, but the operation of the invention is not limited to this particular shape. Any suitable configuration known in the art relating to slot antennas such as rectangular or I-shaped apertures may be used.

Thermistors 22 are mounted across the narrow dimension and intermediate the ends of each aperture. Although thermistors are the presently preferred form of detection means, any suitable square law detection means such as barretters or crystal detectors may be used for this purpose.

Antenna assembly 14 preferably is fabricated in the form of a sandwich of several layers as indicated in FIG. 4. FIG. 4 is diagrammatic rather than pictorial in form and is intended to indicate the operative relationship of the various elements. Insulating base material 23 is faced on one surface with a layer of conductive material 24. Base material 23 and conductive material 24 can be fabricated conveniently from a commercially available glass epoxy sheet clad on one side with a conductive coating.

Conducting leads 25 of thermistors 22 are joined mechanically and electrically to the layer of conductive material 24 so that the sensing portions 26 of the various thermistors are properly positioned in the respective apertures.

Conductive material 24 is divided into several insulated sections by gaps such as 27 cut entirely through its thickness. Gaps 27 may be formed conveniently by printed circuit techniques. The exact shape of the several sections is not critical to the operation of the invention, but is determined largely by considerations of manufacturing convenience. Gaps 27 together with the various apertures serve to form a series electrical circuit in which the individual sections form conducting paths between the thermistors. Electrical terminals 28 are provided on the two extreme sections so that exterior utilization means such as Wheatstone bridge circuit 19 may be connected across the series combination of the detection means.

A thin dielectric sheet 29, cut to the approximate diameter of base material 23, is placed over conductive layer 24. Sheet 29 may be cut conveniently from Mylar drafting film or similar material. Finally, metal foil 30 is cut to the approximate diameter of base material 23 and placed over dielectric sheet 29. Metal foil 30 contains apertures which register with the various apertures in base material 23.

Conductive plates 31, formed of aluminum foil tape or similar material, are affixed to the rear surface of base material 23 so as to cover low frequency apertures 21.

Referring now to FIG. 9, a Wheatstone bridge circuit 19 may be used to actuate indicating meter 11. Antenna assembly 14 is connected to bridge circuit 19 by means of terminals 28. Capacitor 32 provides a low reactance path, insuring that no troublesome radio frequency voltages appear across the bridge elements. The combination of thermistors in antenna assembly 14 forms one arm of bridge 19. Voltage applied to the bridge from source 33 is controlled by calibrating rheostat 34 and switch 35. Rheostat 34 and switch 35 are manipulated by means of external adjusting knob 12 (FIG. 1). Radio frequency radiant energy impinging on antenna assembly 14 causes the resistance of the thermistors to change in accordance with the intensity of the energy intercepted. This change in resistance unbalances the bridge and causes a change in the deflection of meter 11.

To better understand the operation of the various components, assume first that the energy impinging on metal plate 30 is composed entirely of frequencies near the high end of the frequency range of the instrument, and further assume that this energy is linearly polarized in a direction perpendicular to the longitudinal axis of one of the high frequency apertures 20. Radio frequency voltages will be established across the narrow dimension of this aperture in metal foil 30 in a manner well known in the art. This voltage will be coupled to the corresponding aperture in conductive material 24 through the capacitive susceptance of dielectric sheet 29. The radio frequency voltages appearing across this aperture in conductive material 24 cause a current to flow in the associated thermistor. This radio frequency current heats the thermistor, thus lowering its resistance by an amount dependent upon the intensity of the incident radiation. Meanwhile, the remaining thermistors are substantially unaffected by this energy. The second high frequency aperture is oriented so as to be parallel to the direction of polarization and cannot support a radio frequency voltage. The thermistors associated with the low frequency apertures are unaffected by the incident energy because conductive plates 31, cooperating with dielectric base material 23 comprise capacitive susceptances serving to shunt these higher frequencies around the thermistors involved. The radiant energy under these assumed conditions thus affects only one thermistor to any substantial degree.

Since the individual thermistors are connected in a series circuit, however, the resistance as measured at terminals 28 is changed in accordance with the change occurring in the individual thermistor.

If the polarization of the incident radiant energy is rotated 90° from that originally assumed, the response of the individual high frequency apertures is reversed. The thermistors associated with the low frequency apertures are still unaffected because of the action of the capacitive shunting means previously described. The overall series circuit resistance as measured by bridge circuit 19 at terminals 28 is unaffected by the change in polarization.

If, now, the polarization of the assumed radiant energy is again altered so as to lie somewhere between the extreme positions previously considered, the resistance as determined by circuit 19 still remains unchanged. The voltage appearing across a given aperture is proportional to the vector component of the incident wave which is in a plane perpendicular to the longitudinal axis of the aperture. Since the high frequency apertures are disposed at right angles to each other, the voltages appearing across the individual apertures are representative of the magnitudes of orthogonal vector components of the incident wave. However, the thermistors are square law detectors, so that the response of these individual thermistors is proportional to the square of the appropriate vector component. The resistance of the series combination appearing across terminals 28 represents the arithmetical sum of the resistances of the individual thermistors. But the arithemtical sum of the squares of specified orthogonal components of a vector remains constant as the vector is rotated. Consequently, the resistance appearing at terminals 28 is independent of the orientation of the linearly polarized incident wave.

The invention also provides an accurate indication in the case of a circularly polarized wave of incident energy. A circularly polarized wave can be represented by a voltage vector of constant amplitude rotating in a plane perpendicular to the direction of propagation. However, the response of the antenna of this invention remains constant as the plane of polarization of the incident wave is rotated. Therefore, the response of the antenna is accurate for circularly polarized waves as well as linearly polarized waves.

The foregoing discussion presupposed an incident wave whose frequency components were in the higher region of the band so that the thermistors associated with the low frequency apertures 21 were substantialy unaffected by the incident energy.

Assume now, that the incident energy is composed entirely of frequencies in the lower region of the band to be measured. Under these conditions, the high frequency apertures are poorly matched to the comparatively long wavelength incident energy. The situation is aggravated by the fact that the ground plane now appears to be but a small fraction of a wavelength of the incident energy and further by the fact that lossy material 16 appears somewhat reactive at these lower frequencies. As a result of these phenomena, the incident wave will not establish any appreciable voltage across the high frequency apertures. Therefore, the thermistors associated with the high frequency apertures are substantially unaffected by this incident energy. This incident wave, however, can establish a voltage across the low frequency apertures. At these lower frequencies, the shunting effect of conductive plates 31 cooperating with dielectric base material 23 is negligible so that the voltage appearing across the low frequency apertures in metal foil 30 and capacitively coupled to conductive layer 24 will cause a current to flow through the associated thermistors.

The operation of the individual low frequency apertures as the polarization of these lower frequency waves of energy is changed is identical to the operation of the higher frequency apertures under the conditions originally assumed.

At intermediate frequencies, the total response of the antenna assembly consists of a combination of the responses of the thermistors associated with both the high frequency and the low frequency apertures. The high frequency apertures are so dimensioned that the lowest frequency at which these apertures will resonate is higher than the highest frequency to be measured. The response of the thermistors associated with these apertures thus gradually diminishes as the frequency of the incident wave approaches the lower limit of the instrument. The operation of the low frequency apertures is the reverse of this. The low frequency apertures are so dimensioned that they resonate near the lowest frequency in the range of the instrument. These apertures and the capacitive shunting means cooperate with the associated thermistors to provide a response which gradually increases as the frequency of the incident wave of energy is decreased toward the lower limit of the range of the instrument.

Experiment has proven that if the high frequency apertures are sufficiently small so that they do not resonate at any frequency below the highest frequency of interest, the antenna will be uniformly sensitive in terms of power collected over a frequency range in excess of 16:1. Experiment has further shown that the use of the low frequency apertures can extend the low frequency response so that a substantially uniform sensitivity can be attained over a frequency range of 25:1.

FIGS. 5 and 6 illustrate an embodiment of the invention which is useful when the extreme frequency range available with the preferred embodiment is not necessary. This embodiment of the invention is similar to the preferred embodiment of FIGS. 3 and 4 except that only the high frequency apertures are used. The layer of conductive material 24a is divided into appropriate sections by gaps such as 27a and apertures 20a so as to form a series electrical circuit in which the individual sections form conducting paths between the thermistors. As in the preferred embodiment, elongated apertures 20a are oriented with their longitudinal axes substantially at right angles to each other and have an electrical length shorter than one-half the wavelength of the highest frequency to be measured. Thermistors 22a are mounted across the narrow dimension and intermediate the ends of the apertures 20a. Antenna assembly 14a is fabricated in the form of a sandwich of several layers in the same manner as antenna assembly 14 of the preferred embodiment. Terminal means 28a serve to connect the antenna assembly to exterior utilization means such as Wheatstone bridge circuit 19.

FIGS. 7 and 8 depict a third embodiment of the invention. This embodiment also utilizes only high frequency apertures and is useful in applications wherein the extreme frequency range of the preferred embodiment is not required. Antenna assembly 14b contains a pair of high frequency apertures 20b, oriented with their longitudinal axes substantially at right angles to each other and having electrical lengths shorter than one-half the wavelength of the highest frequency to be measured. Thermistors 22b are mounted across the narrow dimension and intermediate the ends of each aperture.

Antenna assembly 14b is fabricated from an insulating base material 23b faced on each surface with a conductive material. Commercially available double copper clad glass epoxy sheet is convenient for this purpose. A first layer of conductive material 36 on the front surface of base material 23b is designed to be exposed to the radiant energy to be measured.

The layer of conductive material on the rear surface of base material 23b is divided into two sections by diametral gap 27b cut entirely through the thickness of the conductive material. The two sections thus formed constitute a second layer of conductive material 37 and a third layer of conductive material 38, respectively.

Apertures 20b are cut through the entire thickness of antenna assembly 14b and are so disposed that one aperture appears in the second conductive layer 37 whereas the other aperture appears in the third conductive layer 38. A thermistor is mounted across the narrow dimension and intermediate the ends of each aperture. One conducting lead of each thermistor is mechanically and electrically joined to the first conductive layer 36. The remaining lead of the thermistor adjacent the second conductive layer is mechanically and electrically joined to the second conductive layer 37, and the remaining lead of the thermistor adjacent the third conductive layer is mechanically and electrically joined to the third conductive layer 38 as best shown in FIG. 8. The various conductive layers and thermistors thus form a series electrical circuit. Terminal means 28b affixed to the second and third conductive layers respectively, serve to connect the series combination of thermistors to external utilization means such as Wheatstone bridge circuit 19. Radiant energy impinging on the first conductive layer 36 establishes a voltage across the apertures in that layer as explained previously with regard to the preferred embodiment of FIG. 3. In the present embodiment, one conductor of each thermistor is conductively connected to the first conductive layer whereas the remaining conductor of each thermistor is capacitively coupled to the first conductive layer through the base material 23b.

The effects of changing polarization are the same in this embodiment as the effects explained with respect to the preferred embodiment of FIG. 3.

Although the previous discussion has been concerned solely with apertures functioning as slot type antennas, it will be appreciated by those skilled in the art that other types of radio frequency wave responsive means such as dipoles might be used in place of the elongated apertures. Furthermore, although the discussion has been concerned with detection means connected in series electrical circuits, such means can be connected in other types of circuits in which the individual responses are additive without departing from the true spirit of the invention.

Many modifications and variations of the embodiments shown and described may be devised, all within the scope of the present invention, therefore, it is intended that all matter contained in the foregoing description and drawings shall be interpreted as illustrative rather than limiting.

What is claimed is.

1. Apparatus for measuring radio frequency power of any polarization comprising a sheet of nonconducting base material having a pair of elongated apertures therein, the individual apertures of said pair being disposed with their longitudinal axes substantially at right angles to each other and of such dimensions that the electrical length of each aperture of said pair of apertures is shorter than half the wavelength of the highest frequency to be measured, a layer of conductive material affixed to one surface of said base material and having apertures therein registering with the apertures in the base material, a first and a second electromagnetic energy detection means mounted across the narrow dimension and intermediate the ends of the first and the second apertures in the base material respectively, electrical conducting means interconnecting said first and second detection means in an additive electrical circuit, and terminal means conductively connected to the combination of said first and second detection means whereby the antenna may be connected to external utilization means.

2. The apparatus of claim 1 wherein the electromagnetic energy detection means comprise temperature sensitive resistance elements.

3. The apparatus of claim 1 wherein the electromagnetic energy detection means comprise thermistors.

4. Apparatus for measuring radio frequency power of any polarization comprising a sheet of nonconducting base material having a pair of elongated apertures therein, the individual apertures of said pair disposed with their longitudinal axes substantially at right angles to each other and of such dimensions that the electrical length of each aperture of said pair of apertures is shorter than one-half the wavelength of the highest frequency energy to be measured, a layer of conductive material affixed to one surface of said base material and having apertures therein registering with the apertures in said base material, a first electromagnetic energy detecting means mounted across the narrow dimension and intermediate the ends of one aperture of said pair of apertures in the base material, a second electromagnetic energy detecting means mounted across the narrow dimensions and intermediate the ends of the other aperture of said pair of apertures in the base material, capacitive coupling means between said layer of conductive material and said first and second detecting means whereby a portion of the radio frequency energy to be measured is coupled from said layer of conductive material to said first and second detecting means, electrical conducting means interconnecting said first and second detecting means in an electrical series circuit, and electrical measuring means conductively connected across the series combination of said detecting means.

5. Apparatus for measuring radio frequency power of any polarization comprising a sheet of nonconducting base material having a pair of elongated apertures therein, the individual apertures of said pair being disposed with their longitudinal axes substantially at right angles to each other, and of such dimensions that the electrical length of each aperture is shorter than one-half the wavelength of the highest frequency to be measured, a first layer of conductive material on the front surface of said base material, a second layer of conductive material on the rear surface of said base material surrounding one of said pair of apertures, a third layer of conductive material on the rear surface of said base material surrounding the other of said pair of apertures and insulated from said second layer, electromagnetic energy detecting means mounted across the narrow dimensions of one aperture and conductively connected between said first layer and said second layer, electromagnetic energy detecting means mounted across the narrow dimension of the other aperture and conductively connected between said first layer and said third layer, electrical measuring means, and electrical conducting means connecting said measuring means between said second layer and said third layer.

6. Apparatus for measuring radio frequency power of any polarization comprising a sheet of nonconducting base material having a pair of elongated apertures therein, the individual apertures of said pair being disposed with their longitudinal axes substantially at right angles to each other and of such dimensions that the electrical length of each aperture is less than one-half wavelength of the highest frequency energy to be measured; electromagnetic energy detecting means mounted across the narrow dimension and intermediate the ends of each of said apertures; a discontinuous layer of conductive material on one surface of said base material having apertures registering with the apertures in said base material and comprised of sections insulated from each other and interconnecting said detecting means in a series electrical circuit; a thin dielectric sheet covering said conductive material, a metal foil covering the dielectric sheet and having apertures therein registering with said first and second pairs of apertures in the base material whereby voltages induced by received radio frequency energy in the metal foil are capacitively coupled to said detecting means; electrical measuring means to indicate the response of said detecting means, and electrical conducting means interconnecting said detecting means and said electrical measuring means.

7. An antenna comprising an extended ground plane having first and second pairs of elongated apertures therein disposed so that the longitudinal axes of the individual apertures of a given pair of substantially at right angles to each other and of such dimensions that the electrical length of each aperture in the first pair is shorter than one-half the wavelength of the highest frequency energy to be measured whereas the electrical length of each aperture in the second pair is comparable to one-half the wavelength of the lowest frequency energy to be measured; individual electromagnetic radiation detection means coupled to each aperture; individual capacitive shunting means connected across each aperture of said second pair of apertures whereby the higher frequency energy of the band of frequencies to be measured is shunted around the detection means coupled to that aperture; electrical conducting means interconnecting said individual detection means in a series electrical circuit; terminal means conductively connected to the series combination of said detection means whereby the antenna may be coupled to external utilization means.

8. Apparatus for measuring radio frequency power of any polarization comprising a sheet of nonconducting base material having first and second pairs of elongated apertures therein disposed so that the longitudinal axes of the individual apertures of a given pair are substantially at right angles to each other and of such dimensions that the electrical length of each aperture in the first pair is shorter than one-half the wavelength of the highest frequency energy to be measured whereas the electrical length of each aperture in the second pair is comparable to one-half the wavelength of the lowest frequency energy to be measured; electromagnetic energy detecting means mounted across the narrow dimension and intermediate the ends of each aperture; a discontinuous layer of conductive material on the front surface of said base material having apertures registering with the apertures in said base material and comprised of insulated sections interconnecting said detecting means in a series electrical circuit; conductive plates extending across each of the apertures of the said second pair in said base material and affixed to the rear surface of the base material whereby the higher frequencies of received energy are capacitively shunted around the detecting means mounted across the apertures of the said second pair; a thin dielectric sheet covering the said conductive material; a metal foil covering the dielectric sheet and having apertures registering with the said first and second pairs of apertures in the base material whereby voltages induced by received radio frequency energy in the metal foil are capacitively coupled to the said detecting means; electrical measuring means to indicate the response of said detecting means, and electrical conducting means to connect the measuring means across the series combination of detecting means.

9. Apparatus for measuring radio frequency power density of any polarization comprising a sheet of nonconducting base material having first and second pairs of elongated apertures therein disposed so that the longitudinal axes of the individual apertures of a given pair are substantially at right angles to each other and of such dimensions that the electrical length of each aperture in the first pair is shorter than one-half the wavelength of the highest frequency energy to be measured whereas the electrical length of each aperture in the second pair is comparable to one-half the wavelength of the lowest frequency energy to be measured; thermistors mounted across the narrow dimension and intermediate the ends of each aperture; a discontinuous layer of conductive material on the front surface of said base material having apertures registering with the apertures in said base material and comprised of insulated sections interconnecting said detecting means in a series electrical circuit; conductive plates extending across each of the apertures of the second pair in said base material and affixed to the rear surface of the base material whereby the higher frequencies of received energy are capacitively shunted around the thermistors mounted across the apertures of the said second pair; a thin dielectric sheet covering the said conductive material; a metal foil covering the dielectric sheet and having apertures registering with the said first and second pairs of apertures in the base material whereby voltages induced by received radio frequency energy in the metal foil are capacitively coupled to the said thermistors; a resistance measuring circuit connected across the series combination of thermistors; and a unitary housing to support the entire apparatus in operative condition at all times during the measurement process.

References Cited in the file of this patent

UNITED STATES PATENTS

| 2,448,006 | Starr | Aug. 24, 1948 |
| 3,031,665 | Marie | Apr. 24, 1962 |

FOREIGN PATENTS

| 277,039 | Great Britain | Apr. 19, 1928 |
| 645,818 | Great Britain | Nov. 8, 1950 |